(12) United States Patent
Nakayama

(10) Patent No.: US 11,038,604 B2
(45) Date of Patent: Jun. 15, 2021

(54) COMMUNICATION DEVICE, COMMUNICATION SYSTEM, AND COMMUNICATION METHOD

(71) Applicant: NEC CORPORATION, Tokyo (JP)

(72) Inventor: Naoya Nakayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 84 days.

(21) Appl. No.: 16/343,119

(22) PCT Filed: Oct. 16, 2017

(86) PCT No.: PCT/JP2017/037303
§ 371 (c)(1),
(2) Date: Apr. 18, 2019

(87) PCT Pub. No.: WO2018/074393
PCT Pub. Date: Apr. 26, 2018

(65) Prior Publication Data
US 2019/0268080 A1 Aug. 29, 2019

(30) Foreign Application Priority Data

Oct. 19, 2016 (JP) .............................. JP2016-204820

(51) Int. Cl.
*H04B 17/336* (2015.01)
*H04B 7/005* (2006.01)
(Continued)

(52) U.S. Cl.
CPC .......... *H04B 17/336* (2015.01); *H04B 7/005* (2013.01); *H04B 17/309* (2015.01); *H04L 1/00* (2013.01);
(Continued)

(58) Field of Classification Search
None
See application file for complete search history.

(56) References Cited

U.S. PATENT DOCUMENTS

| | | | | |
|---|---|---|---|---|
| 5,396,645 A | * | 3/1995 | Huff | H04B 7/082 455/134 |
| 6,847,628 B1 | * | 1/2005 | Sakuma | H04B 7/0602 370/347 |

(Continued)

FOREIGN PATENT DOCUMENTS

| | | |
|---|---|---|
| EP | 1 255 368 A1 | 11/2002 |
| JP | 2005-198323 A | 7/2005 |

(Continued)

OTHER PUBLICATIONS

International Search Report for PCT/JP2017/037303 dated Jan. 9, 2018 (PCT/ISA/210).

(Continued)

*Primary Examiner* — Bunjob Jaroenchonwanit

(57) ABSTRACT

A fading assessment unit 34 assesses the degree of fading of a received radio wave. An SNR calculation unit 33 calculates an SNR value of a signal based on the radio wave. A communication mode determination unit 35 determines the communication mode of communication from a transmission side of the radio wave on the basis of the result of the assessment by the fading assessment unit 34 and the SNR value calculated by the SNR calculation unit 33.

11 Claims, 10 Drawing Sheets

(51) Int. Cl.
*H04L 1/00* (2006.01)
*H04L 25/03* (2006.01)
*H04L 27/26* (2006.01)
*H04W 28/18* (2009.01)
*H04B 17/309* (2015.01)
*H04L 27/00* (2006.01)

(52) U.S. Cl.
CPC ...... *H04L 1/0017* (2013.01); *H04L 25/03019* (2013.01); *H04L 25/03261* (2013.01); *H04L 27/00* (2013.01); *H04L 27/2688* (2013.01); *H04W 28/18* (2013.01); *H04L 2025/0342* (2013.01)

(56) References Cited

U.S. PATENT DOCUMENTS

| | | | | |
|---|---|---|---|---|
| 7,133,698 | B2* | 11/2006 | Miyoshi | H04B 7/0615 455/562.1 |
| 8,310,986 | B1* | 11/2012 | Gormley | H04W 28/22 370/328 |
| 8,385,223 | B2* | 2/2013 | Miller | H04B 7/18513 370/252 |
| 9,083,422 | B2* | 7/2015 | Coon | H04W 76/14 |
| 2002/0110188 | A1* | 8/2002 | Ohmori | H04L 25/03038 375/232 |
| 2002/0160795 | A1* | 10/2002 | Beech | H04L 27/367 455/504 |
| 2004/0095990 | A1* | 5/2004 | Gossett | H04B 1/707 375/148 |
| 2004/0203476 | A1* | 10/2004 | Liu | H04L 1/0029 455/69 |
| 2004/0203705 | A1* | 10/2004 | Lundby | H04L 1/1692 455/422.1 |
| 2005/0014515 | A1* | 1/2005 | Suzuki | H04W 36/32 455/456.1 |
| 2006/0268976 | A1* | 11/2006 | Baum | H04L 1/0009 375/239 |
| 2007/0077952 | A1* | 4/2007 | Sartori | H04L 1/0028 455/515 |
| 2007/0147485 | A1* | 6/2007 | Sakamoto | H04L 1/0026 375/219 |
| 2007/0189237 | A1* | 8/2007 | Jaatinen | H04L 5/0051 370/335 |
| 2007/0202826 | A1* | 8/2007 | Dean | H04B 17/40 455/230 |
| 2007/0211810 | A1* | 9/2007 | Bohnke | H04L 5/0094 375/260 |
| 2007/0242955 | A1* | 10/2007 | Kavehrad | H04B 10/1121 398/130 |
| 2008/0084586 | A1* | 4/2008 | Nagata | H04N 1/6086 358/448 |
| 2008/0232439 | A1* | 9/2008 | Chen | H04L 25/03235 375/148 |
| 2010/0002644 | A1* | 1/2010 | Choi | H04L 1/1893 370/329 |
| 2010/0128762 | A1* | 5/2010 | Nabetani | H04L 1/0005 375/219 |
| 2010/0142461 | A1* | 6/2010 | Miki | H04L 5/0092 370/329 |
| 2010/0166101 | A1* | 7/2010 | Bisaglia | H04L 27/2331 375/283 |
| 2010/0279614 | A1* | 11/2010 | Hagiwara | H04L 1/0017 455/42 |
| 2011/0244803 | A1* | 10/2011 | Ichikawa | H04L 1/0025 455/67.7 |
| 2012/0106619 | A1* | 5/2012 | Kawauchi | H04L 25/03057 375/233 |
| 2012/0257665 | A1* | 10/2012 | Honda | H04L 27/0012 375/227 |
| 2013/0272456 | A1* | 10/2013 | Hayami | H03M 13/3715 375/340 |
| 2014/0229804 | A1* | 8/2014 | Hong | H04L 1/0071 714/776 |
| 2014/0355660 | A1* | 12/2014 | Kameya | H04L 25/03114 375/232 |
| 2015/0032446 | A1* | 1/2015 | Dickins | G10L 25/84 704/233 |
| 2015/0055722 | A1* | 2/2015 | Eliaz | H04B 17/29 375/262 |
| 2017/0257238 | A1* | 9/2017 | Qian | H04L 27/2628 |
| 2019/0123827 | A1* | 4/2019 | Adams | H04B 10/40 |
| 2019/0347780 | A1* | 11/2019 | Asano | G06K 9/4652 |
| 2019/0356580 | A1* | 11/2019 | Licardie | H04L 1/0041 |
| 2020/0195370 | A1* | 6/2020 | Li | H04L 1/00 |

FOREIGN PATENT DOCUMENTS

| | | |
|---|---|---|
| JP | 2006-332988 A | 12/2006 |
| JP | 2008-53906 A | 3/2008 |
| JP | 2009-111618 A | 5/2009 |
| JP | 2010-087707 A | 4/2010 |
| JP | 2011-004118 A | 1/2011 |
| JP | 2012-064992 A | 3/2012 |
| JP | 2014-045486 A | 3/2014 |

OTHER PUBLICATIONS

Written Opinion for PCT/JP2017/037303 dated Jan. 9, 2018 (PCT/ISA/237).

* cited by examiner

Fig. 5

| DETECTED FADING DEGREE IS SMALL | | | DETECTED FADING DEGREE IS MEDIUM | | | DETECTED FADING DEGREE IS LARGE | | |
| --- | --- | --- | --- | --- | --- | --- | --- | --- |
| ESTIMATED SNR[dB] | MODULATION METHOD | CODING RATE | ESTIMATED SNR[dB] | MODULATION METHOD | CODING RATE | ESTIMATED SNR[dB] | MODULATION METHOD | CODING RATE |
| ~12 | QPSK | 2/5 | ~15 | QPSK | 2/5 | ~18 | QPSK | 2/5 |
| 13 | | 3/5 | 16 | | 3/5 | 19 | | 3/5 |
| 14 | | 4/5 | 17 | | 4/5 | 20 | | 4/5 |
| 15 | 16QAM | 2/5 | 18 | 16QAM | 2/5 | 21 | 16QAM | 2/5 |
| 16 | | 3/5 | 19 | | 3/5 | 22 | | 3/5 |
| 17 | | 4/5 | 20 | | 4/5 | 23 | | 4/5 |
| 18 | 32QAM | 2/5 | 21 | 32QAM | 2/5 | 24 | 32QAM | 2/5 |
| 19 | | 3/5 | 22 | | 3/5 | 25 | | 3/5 |
| 20 | | 4/5 | 23 | | 4/5 | 26 | | 4/5 |
| 21 | 64QAM | 2/5 | 24 | 64QAM | 2/5 | 27 | 64QAM | 2/5 |
| 22 | | 3/5 | 25 | | 3/5 | 28 | | 3/5 |
| 23~ | | 4/5 | 26~ | | 4/5 | 29~ | | 4/5 |

COMMUNICATION DEVICE, COMMUNICATION SYSTEM, AND COMMUNICATION METHOD

CROSS REFERENCE TO RELATED APPLICATIONS

This application is a National Stage of International Application No. PCT/JP2017/037303 filed Oct. 16, 2017, claiming priority based on Japanese Patent Application No. 2016-204820 filed Oct. 19, 2016, the disclosure of which is incorporated herein in its entirety by reference.

TECHNICAL FIELD

The present invention relates to a communication device, a communication system, and a communication method for wireless communication.

BACKGROUND ART

There is a communication system in which wireless communication is performed between communication devices facing each other. When a noise component is mixed into signal components to be transmitted and received, in a propagation path for wireless communication between the communication devices, an error may occur in data. In addition, a communication environment in the propagation path changes over time.

In this regard, an adaptive modulation method is a modulation method for radio waves to be transmitted is changed depending on a signal-to-noise ratio (SNR) in radio waves received by a reception side, a bit error rate (BER) in data based on the radio waves received by the reception side, or the like.

PTLs 1 and 2 describe a method of selecting a communication mode, based on an adaptive modulation method, depending on a value of a signal-to-interference ratio (SIR).

PTL 3 describes selecting a modulation method, based on an adaptive modulation method, depending on a value of a signal-to-interference plus noise ratio (SINR).

PTL 4 describes selecting a communication mode, based on an adaptive modulation method, depending on a value of a block error rate (BLER).

CITATION LIST

Patent Literature

[PTL 1] Japanese Unexamined Patent Application Publication No. 2006-332988
[PTL 2] Japanese Unexamined Patent Application Publication No. 2008-53906
[PTL 3] Japanese Unexamined Patent Application Publication No. 2009-111618
[PTL 4] European Patent Application Publication No. 1255368

SUMMARY OF INVENTION

Technical Problem

However, even when a value of the SIR or a value of the SINR indicates that a communication environment is favorable, a bit error rate may be high due to a fading effect. Accordingly, when a communication mode or a modulation method is selected in accordance with the methods described in PTLs 1 to 3, there is a problem that a bit error rate may be high. Further, in order to prevent an increase in bit error rate in the methods described in PTLs 1 to 3, it is necessary to select a communication mode or a modulation method with a low transmission speed in order to avoid the fading effect. This causes a problem that an average transmission speed between communication devices cannot be increased.

Further, according to the method described in PTL 4, a communication mode is selected depending on a value of the BLER that can be calculated when an error occurs in received data, and thus occurrence of an error cannot be prevented.

According to the method described in each PTL, a burst bit error due to fading or the like is not distinguished from a random bit error due to noise or the like. In addition, when an error-correcting code with a high random bit error correction such as a low density parity check (LDPC) code and a turbo code is added for dealing with occurrence of a burst bit error, a coding gain deteriorates. Further, in order to perform an adaptive modulation control while maintaining a bit error rate at a low value, it is necessary to select a communication mode or a modulation method with a low transmission speed. This causes a problem that an average transmission speed between communication devices cannot be increased.

Accordingly, an object of the present invention is to provide a communication device, a communication system, and a communication method which are capable of determining a fading degree and selecting an appropriate communication mode depending on a result of the determination.

Solution to Problem

A communication device, according to the present invention, includes: fading determination means for determining a fading degree of a received radio wave; SNR calculation means for calculating a value of an SNR of a signal based on the radio wave; and communication mode determination means for determining a communication mode for the radio wave in communication from a transmission side, based on a determination result by the fading determination means and the value of the SNR calculated by the SNR calculation means.

A communication system, according to the present invention, includes: the communication device according to any one of aspects of the present invention; and a transmission device that performs processing on an input signal and transmits the signal in accordance with the communication mode determined by the communication mode determination means in the communication device.

A communication method, according to the present invention, includes: a fading determination step of determining a fading degree of a received radio wave; an SNR calculation step of calculating a value of an SNR of a signal based on the radio wave; and a communication mode determination step of determining a communication mode in communication for the radio wave from a transmission side, based on a determination result in the fading determination step and the value of the SNR calculated in the SNR calculation step.

Advantageous Effects of Invention

According to the present invention, it is possible to appropriately determine a fading degree and select an appropriate communication mode, based on a result of the determination.

BRIEF DESCRIPTION OF DRAWINGS

FIG. 5 is an explanatory diagram illustrating an example of a communication mode to be selected by a communication mode selection unit.

EXAMPLE EMBODIMENT

First Example Embodiment

Figure 1:
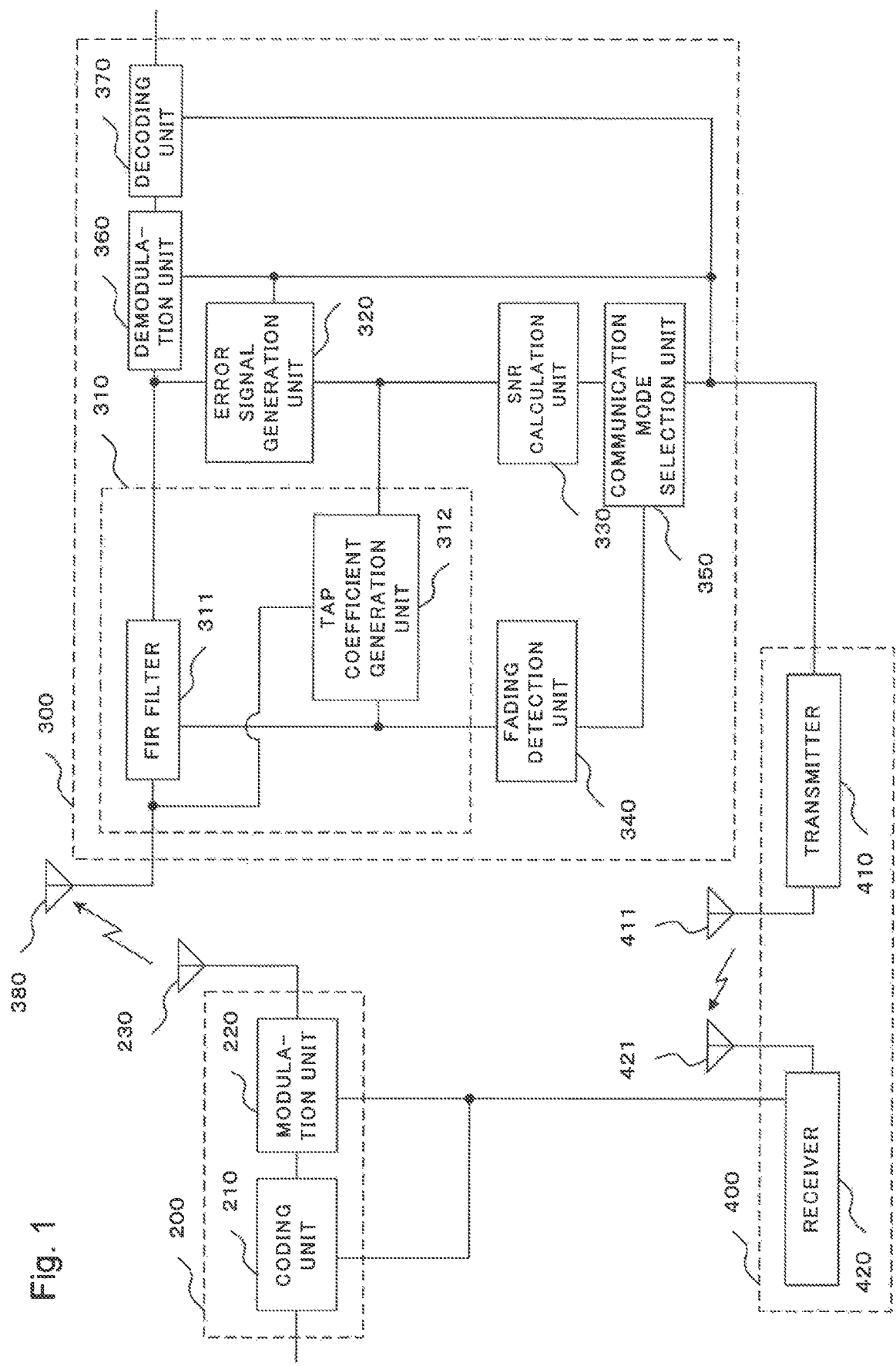
FIG. 1 is a block diagram illustrating a configuration example of a communication system according to a first example embodiment.

A communication system according to a first example embodiment will be described with reference to the drawings. FIG. 1 is a block diagram illustrating a configuration example of the communication system according to the first example embodiment. As illustrated in FIG. 1, the communication system according to the first example embodiment includes a transmission-side communication device 200 and a reception-side communication device 300. Then, it is assumed that the transmission-side communication device 200 and the reception-side communication device 300 are each connected to a notification system 400.

The transmission-side communication device 200 and the reception-side communication device 300 transmit and receive information by wireless communication. Specifically, for example, a radio wave that is wirelessly transmitted via an antenna 230 connected to the transmission-side communication device 200 is received by an antenna 380 connected to the reception-side communication device 300, and is converted into an electrical signal to be input to the reception-side communication device 300.

Further, the reception-side communication device 300 and the transmission-side communication device 200 transmit and receive information via the notification system 400. Specifically, for example, when the electrical signal based on the radio wave transmitted by the transmission-side communication device 200 is input, the reception-side communication device 300 estimates a communication environment for a propagation path for wireless communication based on the electrical signal. Then, the reception-side communication device 300 transmits instruction information indicating an instruction for the transmission-side communication device 200 to the transmission-side communication device 200 via the notification system 400 based on the estimation result. Then, the transmission-side communication device 200 receives the instruction information transmitted by the reception-side communication device 300 via the notification system 400.

Next, a configuration example of the transmission-side communication device 200 will be described. As illustrated in FIG. 1, the transmission-side communication device 200 includes a coding unit 210 and a modulation unit 220. The instruction information from the notification system 400 is input to each of the coding unit 210 and the modulation unit 220. Note that the instruction information is, for example, information indicating a signal modulation method and a coding rate.

The coding unit 210 receives data for transmission. The coding unit 210 adds an error-correcting code to the received data for transmission and performs coding based on the input instruction information. Specifically, when the instruction information indicates that the coding rate is 3/5, the coding unit 210 adds, for example, a 2-bit error-correcting code to 3-bit data for transmission and performs coding. Then, the coding unit 210 inputs the coding data, which is obtained after adding the error-correcting code to the data for transmission and performing coding, to the modulation unit 220. Note that the error-correcting code is, for example, an LDPC code or a turbo code.

The modulation unit 220 modulates a predetermined carrier using input coded data based on the input instruction information. Specifically, when the instruction information indicates that the modulation method is 16 quadrature amplitude modulation (QAM), the modulation unit 220 modulates the carrier using the input coded data based on the modulation method of 16 QAM. Then, the modulation unit 220 inputs, to the antenna 230, a modulation signal obtained by modulating the coded data. The modulation signal, which is an electrical signal, is converted into a radio wave by the antenna 230 and is then transmitted. Note that the modulation unit 220 modulates the carrier using the input coded data based on a modulation method such as binary phase shift keying (BPSK), quadrature phase shift keying (QPSK), 16 QAM, 64 QAM, or 256 QAM, in accordance with the modulation method indicated by the instruction information. In addition, the modulation signal is, for example, a complex signal.

A configuration example of the reception-side communication device 300 will be described. As illustrated in FIG. 1, the reception-side communication device 300 includes an equalizer 310, an error signal generation unit 320, an SNR calculation unit 330, a fading detection unit 340, a communication mode selection unit 350, a demodulation unit 360, and a decoding unit 370.

The equalizer 310 receives a received signal, the received signal being an electrical signal into which the radio wave received by the antenna 380 is converted. The equalizer 310 performs processing of removing a distortion generated due to intersymbol interference on the input received signal. Note that the intersymbol interference may be caused due to fading and the like when the radio wave propagates between the transmission-side communication device 200 and the reception-side communication device 300.

Further, as illustrated in FIG. 1, the equalizer 310 includes a finite impulse response (FIR) filter 311 and a tap coefficient generation unit 312.

Figure 2:
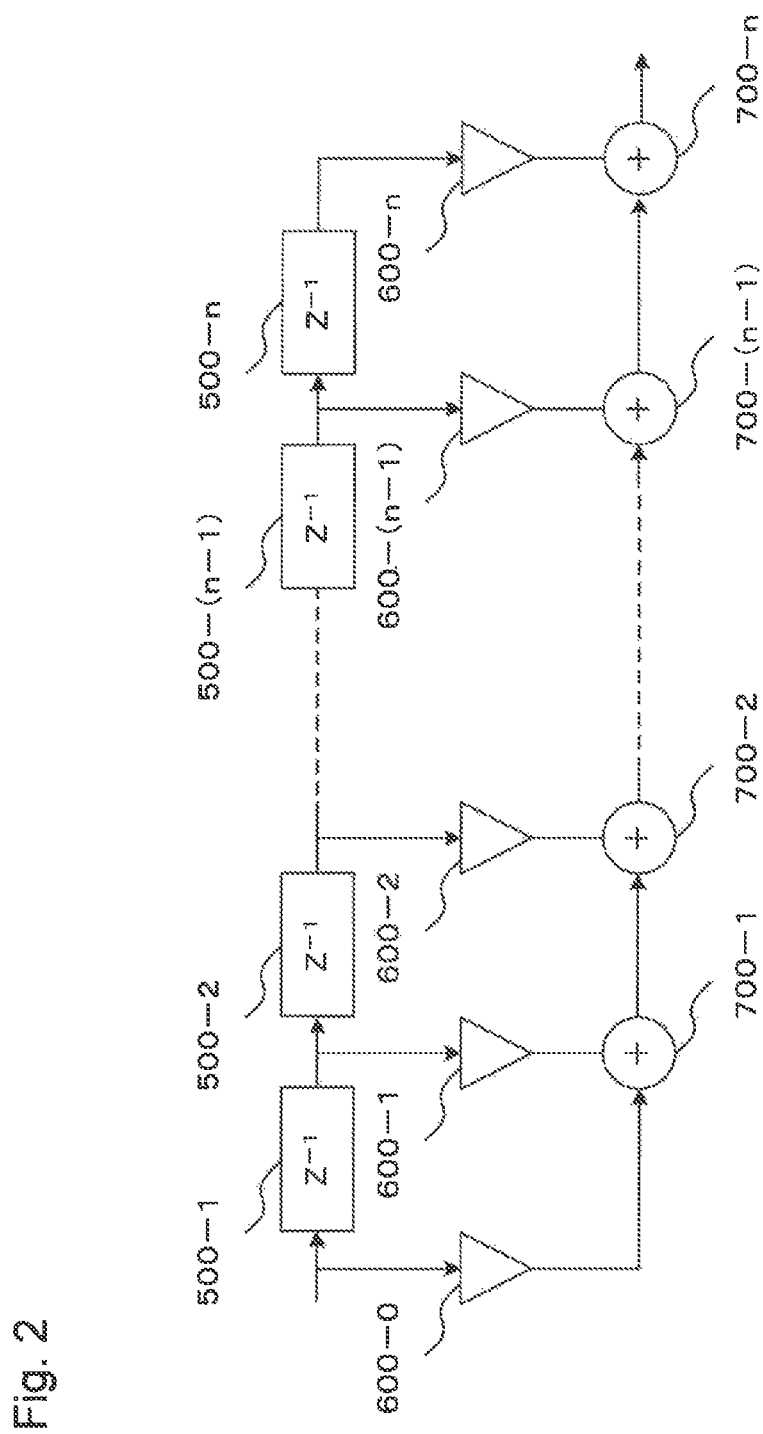
FIG. 2 is a block diagram illustrating a configuration example of an FIR filter.

FIG. 2 is a block diagram illustrating a configuration example of the FIR filter 311. As illustrated in FIG. 2, the FIR filter 311 includes delay units 500-1 to 500-$n$, multiplication units 600-0 to 600-$n$, and addition units 700-1 to 700-$n$. The delay units 500-1 to 500-$n$ are connected in a cascade fashion. The delay units 500-1 to 500-($n$−1) input delayed signals to the subsequent delay units 500-2 to 500-$n$ and the corresponding multiplication units 600-1 to 600-($n$−1), respectively, the delayed signals being obtained by delaying signals input from prior delay units by a predetermined time. Note that, in the present example, the received signal is input to the delay unit 500-1. Further, the delay unit 500-$n$ inputs a delayed signal to the corresponding multiplication unit 600-$n$, the delayed signal being obtained by delaying the signal input from the delay unit 500-($n$−1) by the predetermined time.

The multiplication units 600-0 to 600-$n$ input, to the corresponding addition units 700-1 to 700-$n$, the products of multiplying the input delayed signals by a tap coefficient generated by the tap coefficient generation unit 312. Note that the tap coefficient will be described below. Further, in the present example, the received signal is input to the multiplication unit 600-0. Then, the multiplication unit 600-0 inputs the product of multiplying the input received signal by the set tap coefficient to the addition unit 700-1.

The addition units 700-1 to 700-$n$ are connected in a cascade fashion. The addition units 700-2 to 700-($n$−1) input, to the subsequent addition units 700-2 to 700-$n$, sums of adding the values input from prior addition units and the values of the products input from the corresponding multiplication units 600-2 to 600-($n$−1). Note that the addition unit 700-1 inputs, to the addition unit 700-2, a value of the sum of the value of the product input from the multiplication unit 600-0 and the value of the product input from the multiplication unit 600-1. Further, the addition unit 700-$n$ inputs a post-equalization signal depending on the value of the calculated sum to each of the error signal generation unit 320 and the demodulation unit 360. Note that the post-equalization signal is a signal obtained in such a manner that the equalizer 310 performs processing for removing a distortion generated due to intersymbol interference on the received signal.

Figure 3:
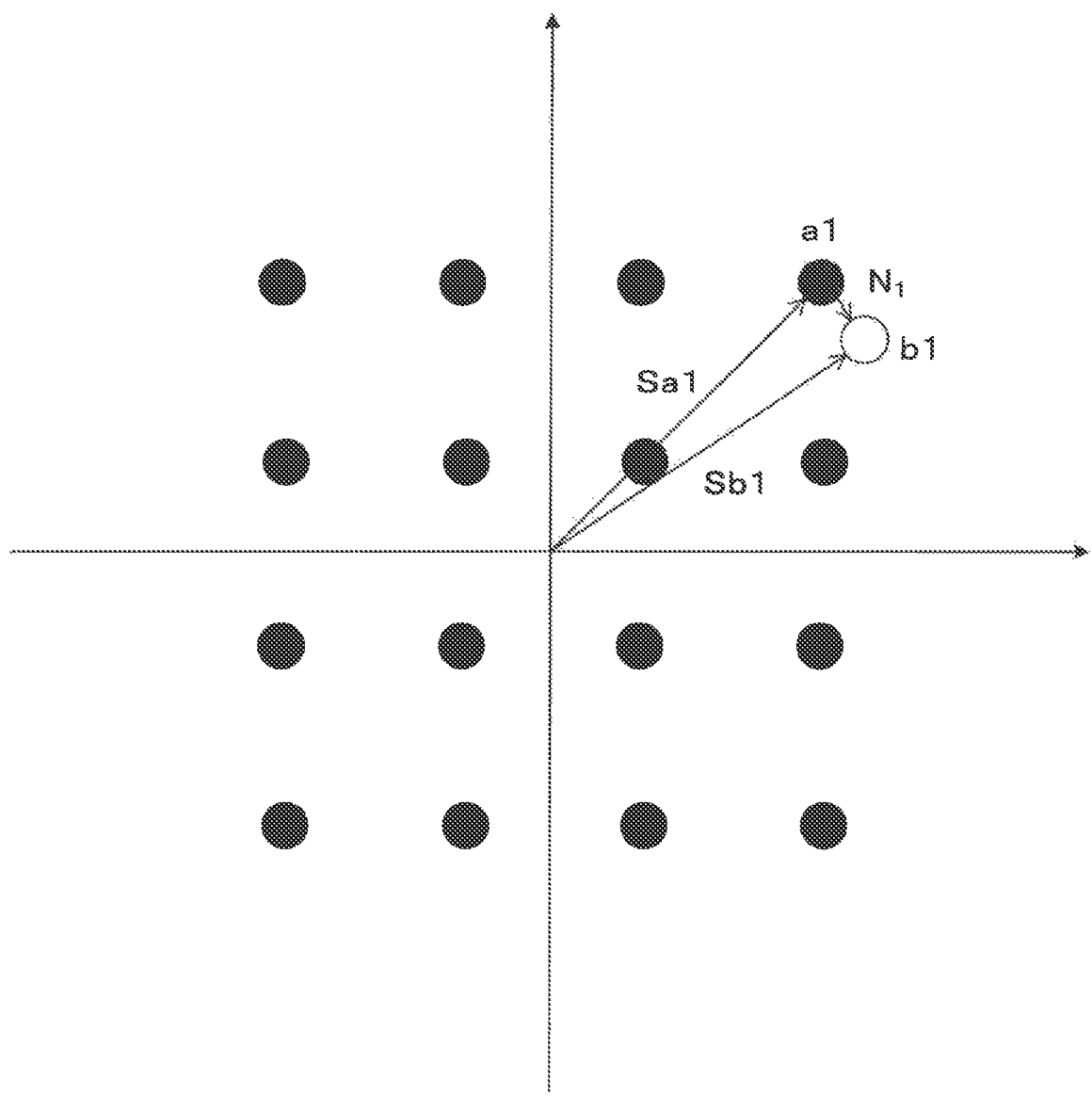
FIG. 3 is an explanatory diagram illustrating an example of an error signal generation method.

The error signal generation unit 320 generates an error signal as an error component signal included in the post-equalization signal. FIG. 3 is an explanatory diagram illustrating an example of the method for generating the error signal.

FIG. 3 illustrates a signal space diagram when the post-equalization signal is a signal modulated by 16 QAM. In the example illustrated in FIG. 3, a position of a signal point of a signal having no distortion is represented by a black circle, and a position of a signal point of a post-equalization signal is represented by a white circle. Accordingly, although processing is performed on the post-equalization signal by the equalizer 310, the distortion generated due to intersymbol interference still remains. Note that the error signal generation unit 320 specifies a modulation method for the input post-equalization signal based on, for example, instruction information input by the communication mode selection unit 350, and also specifies a signal point when a signal modulated by the modulation method has no distortion, i.e., a position of a signal point of a signal with no distortion.

FIG. 3 illustrates an error signal vector N1 formed by a combination of a signal point a1 of a signal with no distortion and a signal point b1 of a post-equalization signal. Specifically, the error signal vector N1 for the signal point b1 of the post-equalization signal is a vector representing a difference obtained by subtracting a vector Sa1 toward the signal point a1 from an origin from a vector Sb1 toward the signal point b1 from the origin.

The error signal generation unit 320 calculates an error signal vector for each signal point of the post-equalization signal as illustrated in FIG. 3. In the example illustrated in FIG. 3, the post-equalization signal is modulated by 16 QAM, and thus 16 signal points of the signal with no distortion and 16 signal points of the post-equalization signal are present (FIG. 3 illustrates only the signal point b1 as one of the signal points of the post-equalization signal). Accordingly, the error signal generation unit 320 calculates error signal vectors N1 to N16. The error signal generation unit 320 inputs error signal information indicating the calculated error signal vectors to each of the tap coefficient generation unit 312 and the SNR calculation unit 330.

The tap coefficient generation unit 312 receives the error signal information indicating the error signal vectors and the received signal. Further, the tap coefficient generation unit 312 generates tap coefficients to be set to the multiplication units 600-0 to 600-$n$ by a known method using, for example, a least mean square (LMS) algorithm, a normalized LMS (NLMS) algorithm, or a recursive least square (RLS) algorithm. Note that, when the distortion to be removed by the FIR filter 311 is much greater, a tap coefficient of a greater value is generated. More specifically, each tap coefficient is generated in such a way that a tap coefficient with a greater absolute value is set to a tap other than a center tap. Further, the tap coefficient generation unit 312 inputs tap coefficient information indicating the generated tap coefficient to each of the FIR filter 311 and the fading detection unit 340.

Further, the tap coefficient generation unit 312 sets the tap coefficients to the multiplication units 600-0 to 600-$n$ based on the tap coefficient information input to the FIR filter 311.

Figure 4A:
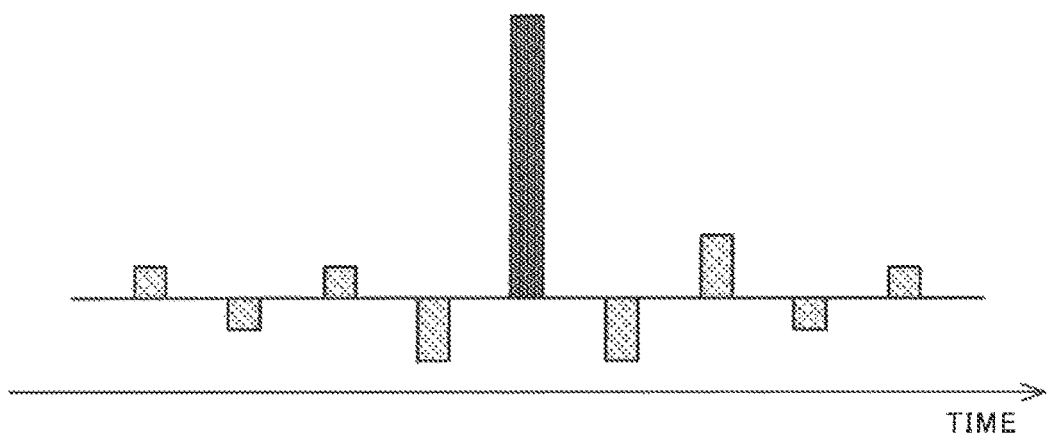
FIG. 4A is an explanatory diagram illustrating a fading degree and a tap coefficient value indicated by tap coefficient information.
Figure 4B:
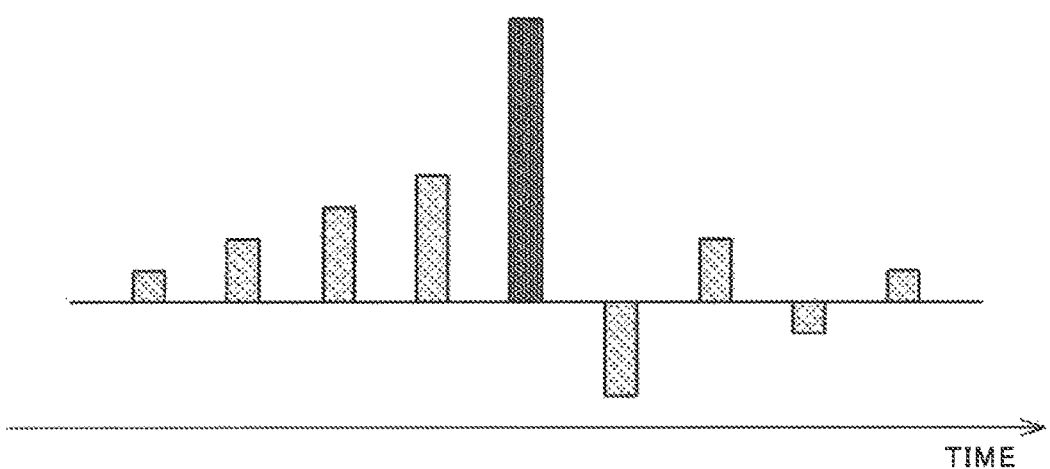
FIG. 4B is an explanatory diagram illustrating the fading degree and the tap coefficient value indicated by the tap coefficient information.
Figure 4C:
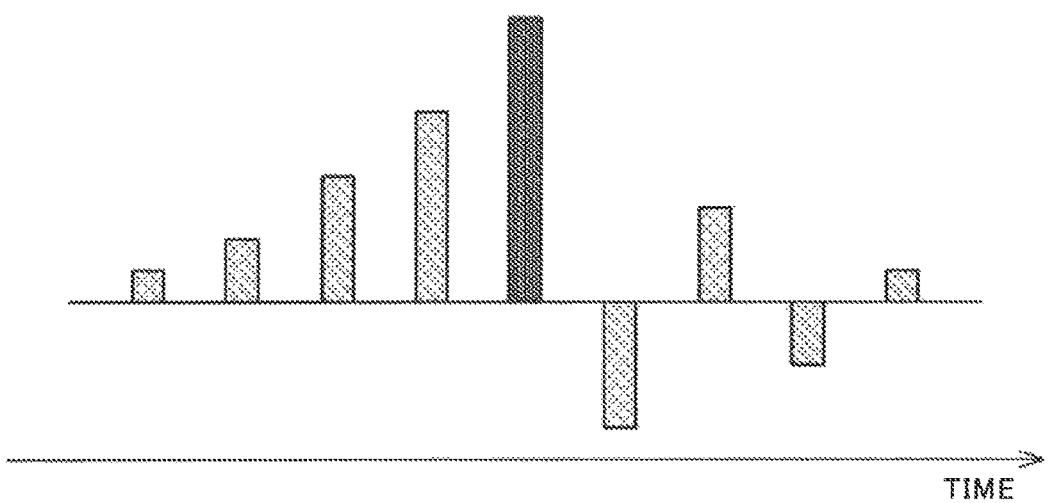
FIG. 4C is an explanatory diagram illustrating the fading degree and the tap coefficient value indicated by the tap coefficient information.

The fading detection unit 340 determines a fading degree based on the tap coefficient information. FIGS. 4A, 4B, and 4C are explanatory diagrams each illustrating the fading degree and the value of each tap coefficient indicated by the tap coefficient information. Note that, in the present example, it is assumed that n=8 and FIGS. 4A, 4B, and 4C illustrate the tap coefficients set to the multiplication units 600-0 to 600-8 in order from the left side. Further, in FIGS. 4A, 4B, and 4C, the magnitude of the value of each of the tap coefficients set to the multiplication units 600-0 to 600-8 is represented by a bar graph. Further, in the present examples illustrated in FIGS. 4A, 4B, and 4C, it is assumed that the tap coefficient set to the multiplication unit 600-4 corresponds to the tap coefficient of the center tap.

The fading detection unit 340 compares the value of the tap coefficient of the center tap with the sum of the absolute values of the values of the tap coefficients set to the multiplication units 600-0 to 600-3 and 600-5 to 600-8. Further, the fading detection unit 340 determines the fading degree depending on the value of the ratio of the sum to the value of the tap coefficient of the center tap.

In the example illustrated in FIG. 4A, the value of the ratio of the sum of the absolute values of the values of the tap coefficients set to the multiplication units 600-0 to 600-3 and 600-5 to 600-8 to the value of the tap coefficient of the center tap is smaller than a predetermined threshold. In this case, the fading detection unit 340 determines that the fading degree is small.

In the example illustrated in FIG. 4C, the value of the ratio of the sum of the absolute values of the values of the tap coefficients set to the multiplication units 600-0 to 600-3 and 600-5 to 600-8 to the value of the tap coefficient of the center tap is greater than a preliminarily determined threshold. In this case, the fading detection unit 340 determines that the fading degree is large.

In the example illustrated in FIG. 4B, the value of the ratio of the value of the sum of the absolute values of the values of the tap coefficients set to the multiplication units 600-0 to 600-3 and 600-5 to 600-8 to the value of the tap coefficient of the center tap is greater than or equal to the predetermined threshold and less than or equal to the preliminarily determined threshold. In this case, the fading detection unit 340 determines that the fading degree is medium.

Hereinafter, the preliminarily determined threshold is referred to as an upper threshold and the predetermined threshold is referred to as a lower threshold.

Note that the fading detection unit 340 may be configured to determine the fading degree based on the value of the tap coefficient of the center tap and the tap coefficient of a specific tap such as a tap adjacent to the center tap. In other words, the fading detection unit 340 may be configured to be able to determine the fading degree for a specific delay wave component.

Specifically, for example, when the value of the ratio obtained by dividing the average value of the absolute values of the values of the tap coefficients set to the multiplication unit 600-3 and the multiplication unit 600-5 by the value of the tap coefficient set to the multiplication unit 600-4 is greater than the upper threshold, the fading detection unit 340 determines that the fading degree is large. Further, when the value of the ratio obtained by dividing the average value of the absolute values of the values of the tap coefficients set to the multiplication unit 600-3 and the multiplication unit 600-5 by the value of the tap coefficient set to the multiplication unit 600-4 is smaller than the lower threshold, the fading detection unit 340 determines that the fading degree is small. Further, when the value of the ratio obtained by dividing the average value of the absolute values of the values of the tap coefficients set to the multiplication unit 600-3 and the multiplication unit 600-5 by the value of the tap coefficient set to the multiplication unit 600-4 is greater than or equal to the lower threshold and less than or equal to the upper threshold, the fading detection unit 340 determines that the fading degree is medium.

Note that the upper threshold is, for example, 0.5. Further, the lower threshold is, for example, 0.05 or 0.1.

In this example, for the sake of simplifying the explanation, it is described that the equalizer 310 includes a group of delay units 500-1 to 500-n, a group of multiplication units 600-0 to 600-n, and a group of addition units 700-1 to 700-n. However, the equalizer 310 may include delay units, multiplication units, and addition units, each of which corresponds to an in-phase (I) component and a quadrature (Q) component of a received signal, when the received signal is a complex signal. Further, a tap coefficient is set to each multiplication unit.

Further, the fading detection unit 340 inputs, to the communication mode selection unit 350, determination result information indicating the determination result. Note that the methods of determining the fading degree used in the fading detection unit 340 described above are merely examples, and the fading detection unit 340 may be configured to determine the fading degree by another method. Specifically, the fading detection unit 340 determines the fading degree based on, for example, a variation in a tap coefficient, a value of an SNR, a value of a bit error rate, or values such as a received signal level, or variations in these values. Further, in the present example, the fading detection unit 340 is configured to determine the fading degree in three levels, i.e., large, medium, and small, but may be configured to determine the fading degree in multiple levels of four or more levels, or may be configured to determine the fading degree to be one of two levels instead. When the fading detection unit 340 is configured to determine the fading degree to be one level of the more multiple levels, the fading degree can be more appropriately determined. Further, when the fading detection unit 340 is configured to determine the fading degree to be one of the two levels, the configuration of a communication mode selection table described below or the like, and processing in the fading detection unit 340 can be more simplified.

The SNR calculation unit 330 estimates an SNR value based on the error signal information input by the error signal generation unit 320. Specifically, the SNR calculation unit 330 subtracts the error signal vectors N1 to N16 indicated by the error signal information from the vectors toward each signal point of the signal with no distortion from the origin, respectively, and calculates the sum of squares of the each absolute value of subtracted vectors. The value of the sum corresponds to a noise component value in the post-equalization signal.

Further, the SNR calculation unit 330 divides the value obtained by squaring the value (magnitude) of each vector toward each signal point of the signal with no distortion from the origin by the value obtained by squaring the each value (magnitude) of the corresponding error signal vectors N1 to N16 indicated by the error signal information. Further, the SNR calculation unit 330 estimates that the sum obtained by adding each of the quotients, which are the division results, corresponds to the value of the SNR.

The SNR calculation unit 330 inputs SNR information indicating the estimated SNR value to the communication mode selection unit 350.

Note that the SNR calculation unit 330 may be configured to estimate the SNR based on each error signal vector input within a predetermined period. Specifically, the SNR calculation unit 330 is configured to estimate the SNR, for example, assuming that the value (magnitude) of each error signal vector is set according to a Gaussian distribution.

The communication mode selection unit 350 selects a communication mode for the signal transmitted from the transmission-side communication device 200 based on the determination result information input by the fading detection unit 340 and the SNR information input by the SNR calculation unit 330.

FIG. 5 is an explanatory diagram illustrating an example of the communication mode selected by the communication mode selection unit 350. In this example, as illustrated in FIG. 5, it is assumed that the communication mode selection table in which the communication mode selected by the communication mode selection unit 350 in a table method is set is preliminarily stored in a storage means in the communication mode selection unit 350. In the example illustrated in FIG. 5, the communication mode selection table is provided with respective fields corresponding to a small fading degree, a medium fading degree, and a large fading degree. In each field, the estimated SNR value is associated with the modulation method and the coding rate. Note that, in each field, a combination of the estimated SNR value and the modulation method and the coding rate is set such that the value of the coding error rate (for example, BER) is less than a predetermined value.

Specifically, in the field corresponding to the small fading degree in the communication mode selection table illustrated in FIG. 5, the value "18" of the SNR is associated with the modulation method "32 QAM" and the coding rate "2/5".

Accordingly, when the determination result information indicates that the fading degree is small and the SNR information indicates that the estimated SNR value is 18, the communication mode selection unit 350 selects 32 QAM as the modulation method and selects 2/5 as the coding rate with reference to the communication mode selection table.

Further, in the field corresponding to the medium fading degree in the communication mode selection table illustrated in FIG. 5, the value "18" of the SNR is associated with the modulation method "16 QAM" and the coding rate "2/5". Accordingly, when the determination result information indicates the medium fading degree and the SNR information indicates that the estimated SNR value is 18, the communication mode selection unit 350 selects 16 QAM as the modulation method and 2/5 as the coding rate with reference to the communication mode selection table.

In the field corresponding to the large fading degree in the communication mode selection table illustrated in FIG. 5, the value "18" of the SNR is associated with the modulation method "QPSK" and the coding rate "2/5". Accordingly, when the determination result information indicates that the fading degree is large and the SNR information indicates that the estimated SNR value is 18, the communication mode selection unit 350 selects QPSK as the modulation method and selects 2/5 as the coding rate with reference to the communication mode selection table.

Figure 6:
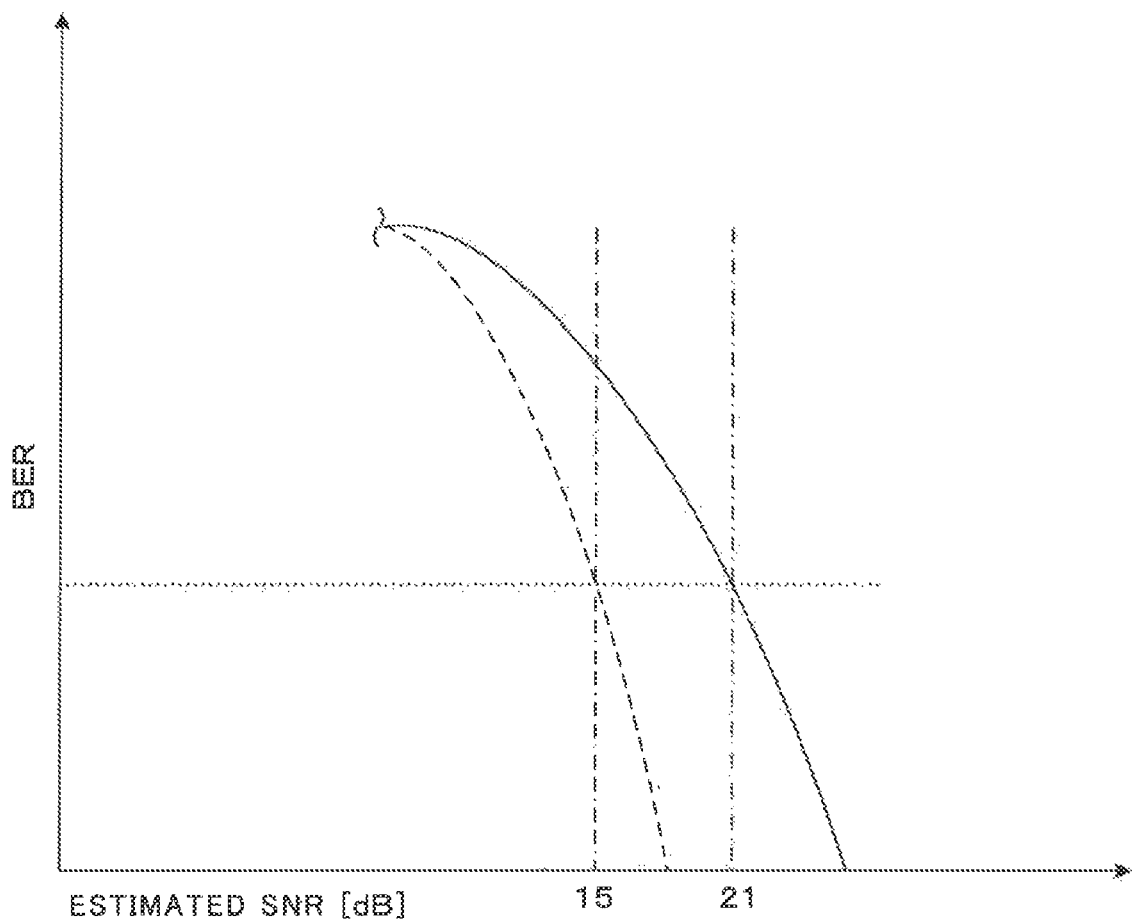
FIG. 6 is an explanatory diagram illustrating an example of SNR vs BER characteristics.

FIG. 6 is an explanatory diagram illustrating an example of SNR vs BER characteristics. In FIG. 6, SNR vs BER characteristics obtained when 16 QAM is selected as the modulation method when the fading effect is large is indicated by a solid line. Further, in FIG. 6, SNR vs BER characteristics obtained when 16 QAM is selected as the modulation method in the case where the fading effect is small are indicated by a dashed line. In addition, in FIG. 6, the allowed value of the BER is indicated by a dotted line. Specifically, in the communication, when the BER value is greater than the value indicated by the dotted line in FIG. 6, a problem that, for example, decoding cannot be appropriately performed on the reception side may be caused. Accordingly, it is assumed that the communication needs to be established with the BER value less than or equal to the value indicated by the dotted line in FIG. 6.

As illustrated in FIG. 6, the BER value increases as the SNR value decreases. In other words, the coding error rate increases as the value of the ratio of a signal component to a noise component decreases. Further, when the SNR value is sufficiently small, the ratio of a bit error due to noise or the like is sufficiently larger than the ratio of a bit error due to fading or the like among all the bit errors. Accordingly, as illustrated in FIG. 6, the bit errors due to fading or the like are overshadowed by the bit errors due to noise or the like, and thus the difference in the BER values due to the difference in the fading degree decreases.

Further, as illustrated in FIG. 6, when the fading effect increases, the BER value increases as the SNR value decreases. In other words, as the fading effect increases, the value of the ratio of the signal component to the noise component decreases and the coding error rate increases.

Accordingly, when the fading effect is not appropriately determined, for example, when the SNR value is smaller than or equal to 21, there arises a need for changing the modulation method from 16 QAM to QPSK which enables stable communication but has a lower transmission speed.

Accordingly, in the present example, the communication mode selection unit 350 selects the communication mode depending on the estimated SNR value and the fading degree. Specifically, FIG. 5 illustrates that the threshold used for determining which one of QPSK and 16 QAM is selected as the modulation method in the communication mode is 21 when the fading degree is large, and is 15 when the fading degree is small.

Accordingly, in the present example, when the fading degree is small, the threshold used for determining which one of QPSK and 16 QAM is selected is set to 15. Accordingly, when the fading degree is small, 16 QAM is selected even when the SNR value is less than or equal to 21, unless the SNR value is less than or equal to 15.

According to such configuration, when the fading effect is small, the modulation method of further increasing the amount of communication per unit time is selected. Further, when the fading effect is large, the modulation method capable of performing wireless communication more stably is selected. Accordingly, an appropriate communication mode is selected depending on the fading degree.

The communication mode selection unit 350 generates instruction information indicating the selected communication mode, and inputs the generated instruction information to each of the error signal generation unit 320, the demodulation unit 360, the decoding unit 370, and the notification system 400.

The demodulation unit 360 performs demodulation processing on the post-equalization signal input from the FIR filter 311 of the equalizer 310 according to the communication mode indicated by the instruction information input by the communication mode selection unit 350. Further, the demodulation unit 360 inputs the demodulated signal obtained by performing demodulation processing on the post-equalization signal to the decoding unit 370. Note that the demodulation unit 360 performs demodulation processing depending on the modulation method indicated by the instruction information on the post-equalization signal corresponding to the coded data on which modulation processing is performed by the modulation unit 220 of the transmission-side communication device 200 in accordance with the modulation method indicated by the instruction information. Further, the demodulation unit 360 inputs a hard determination signal, a log likelihood ratio (LLR), or the like to the decoding unit 370 in accordance with the error-correcting code added to the data for transmission by the coding unit 210 of the transmission-side communication device 200.

The decoding unit 370 performs decoding processing on the demodulated signal input by the demodulation unit 360 in accordance with the communication mode indicated by the instruction information input by the communication mode selection unit 350. Further, the decoding unit 370 outputs reproduced data obtained by performing decoding processing on the demodulated signal. Note that the reproduced data is data obtained by reproducing the data for transmission input to the transmission-side communication device 200.

Note that the decoding unit 370 performs decoding processing depending on the coding rate indicated by the instruction information on the post-equalization signal corresponding to the coding data to which error-correcting code is added by the coding unit 210 of the transmission-side communication device 200 in accordance with the coding rate indicated by the instruction information.

The notification system 400 will now be described. As illustrated in FIG. 1, the notification system 400 includes a transmitter 410 and a receiver 420. An antenna 411 is connected to the transmitter 410. Further, an antenna 421 is connected to the receiver 420. Note that the transmitter 410 may be stored in the same housing as that of the reception-side communication device 300. Further, the receiver 420 may be stored in the same housing as that of the transmission-side communication device 200.

The transmitter 410 receives the instruction information generated by the communication mode selection unit 350. The transmitter 410 inputs, to the antenna 411, the electrical signal which is obtained by modulating a predetermined carrier based on the instruction information. The electrical signal is converted into a radio wave by the antenna 411 and is transmitted.

In the receiver 420, the antenna 421 receives the radio wave, and the received radio wave is converted into an electrical signal. Further, the receiver 420 restores the instruction information from the electrical signal, and inputs the instruction information to each of the coding unit 210 and the modulation unit 220 in the transmission-side communication device 200.

Note that the notification system 400 uses, for transmission and reception of the radio wave (i.e., transmission and reception of instruction information), for example, a carrier having a frequency different from the frequency used for communication from the transmission-side communication device 200 to the reception-side communication device 300. Specifically, the communication in the notification system 400 and the communication between the transmission-side communication device 200 and the reception-side communication device 300 are carried out by, for example, frequency division duplex (FDD). Note that the communication in the notification system 400 may be performed by wireless communication of another method, or may be performed by wired communication.

The coding unit 210, the modulation unit 220, the tap coefficient generation unit 312, the error signal generation unit 320, the SNR calculation unit 330, the fading detection unit 340, the communication mode selection unit 350, the demodulation unit 360, and the decoding unit 370 are implemented by, for example, a central processing unit (CPU) which executes processing by controlling a program, a field programmable gate array (FPGA), or a plurality of electrical circuit networks.

Figure 7:
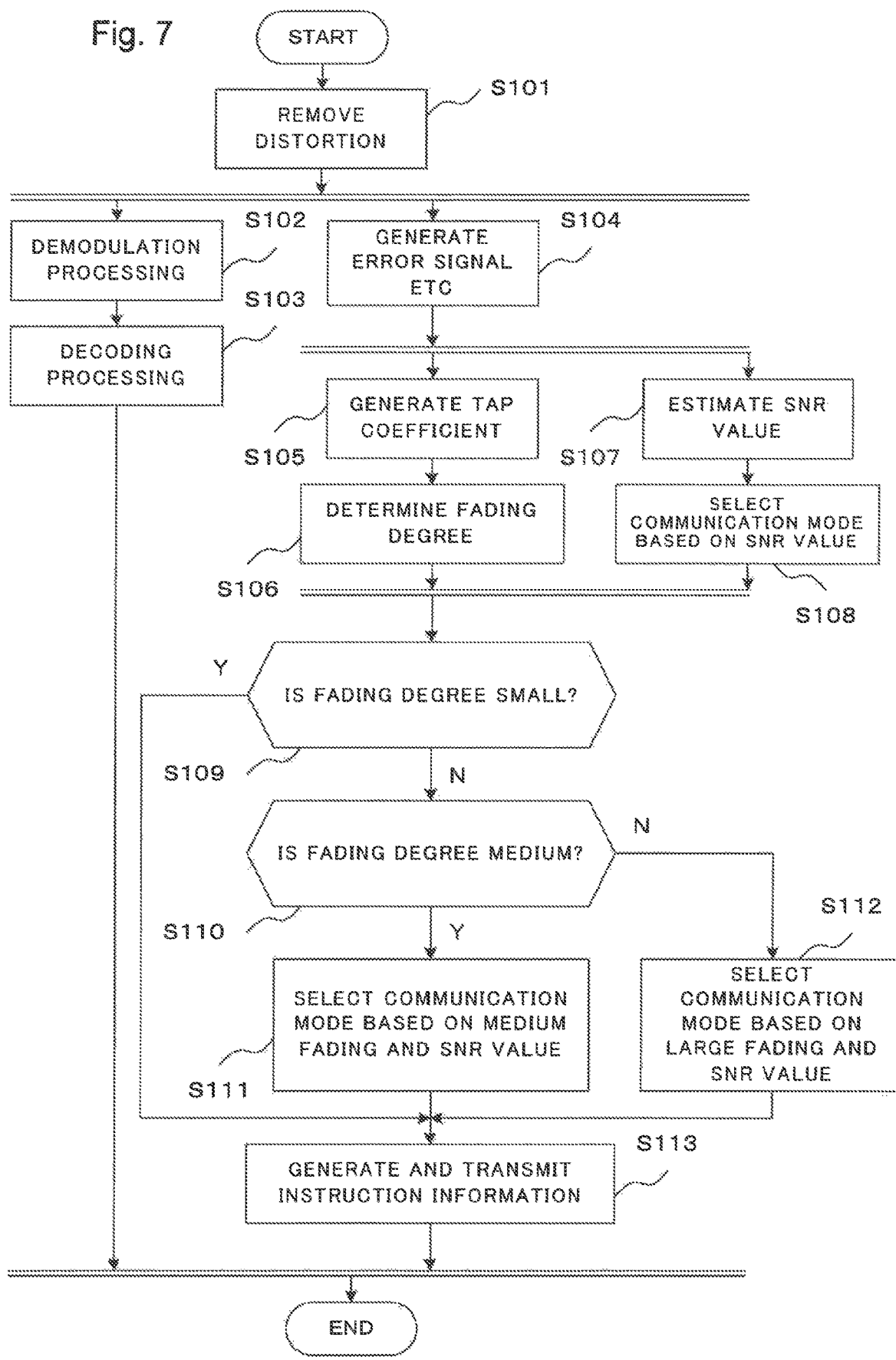
FIG. 7 is a flowchart illustrating an operation of a reception-side communication device.

Next, an operation of the communication system will be described with reference to the drawings. FIG. 7 is a sequence diagram illustrating the operation of the reception-side communication device 300.

The reception-side communication device 300 performs processing of removing a distortion on the received signal which is the electrical signal transmitted by the transmission-side communication device 200 and obtained by converting the radio wave received by the antenna 380 (step S101). Specifically, the processing of removing a distortion is performed on the received signal by the FIR filter 311 of the equalizer 310.

Further, the demodulation unit 360 performs demodulation processing on the post-equalization signal obtained by performing the processing on the received signal in the processing of step S101 (step S102).

The decoding unit 370 performs decoding processing on the post-demodulation signal obtained by performing demodulation processing on the post-equalization signal in the processing of step S102 (step S103). The decoding unit 370 outputs reproduced data obtained by performing the decoding processing on the post-demodulation signal.

Further, the error signal generation unit 320 generates an error signal and an error signal vector, the error signal being a signal indicating an error component included in the post-equalization signal obtained by performing the processing on the received signal in the processing of step S101 (step S104).

Further, the tap coefficient generation unit 312 generates tap coefficients to be set to the multiplication units 600-0 to 600-$n$ based on the received signal and the error signal generated in the processing of step S104 (step S105). The tap coefficient generation unit 312 sets the tap coefficients generated in the processing of step S105 to the respective multiplication units 600-0 to 600-$n$.

The fading detection unit 340 determines a fading degree based on the tap coefficients generated in the processing of step S105 (step S106).

Further, the SNR calculation unit 330 estimates an SNR value based on the error signal information generated by the error signal generation unit 320 in the processing of step S104 (step S107).

Further, the communication mode selection unit 350 selects the communication mode for the signal transmitted from the transmission-side communication device 200 based on the result of determination by the fading detection unit 340 in the processing of step S106 and the SNR value estimated by the SNR calculation unit 330 in the processing of step S107.

Specifically, for example, the communication mode selection unit 350 first selects the communication mode for the modulation method and the coding rate which are associated with the SNR value estimated by the SNR calculation unit 330 in the processing of step S107, in the field corresponding to the small fading degree in the communication mode selection table illustrated in FIG. 5 (step S108).

Further, for example, if the communication mode selection unit 350 determines that the fading degree is small in the processing of step S106 (Y in step S109), the communication mode selection unit 350 shifts to step S113, and if not (N in step S109), the communication mode selection unit 350 shifts to the processing of step S110.

Further, in the processing of step S110, if the communication mode selection unit 350 determines that the fading degree is medium in the processing of step S106 (Y in step S110), the communication mode selection unit 350 shifts to step S111, and if not (N in step S110), i.e., if it is determined that the fading degree is large in the processing of step S106, the communication mode selection unit 350 shifts to the processing of step S112.

In the processing of step S111, the communication mode selection unit 350 changes the selected content to the communication mode for the modulation method and the coding rate which are associated with the SNR value estimated by the SNR calculation unit 330 in the processing of step S107, in the field corresponding to the medium fading degree in the communication mode selection table illustrated in FIG. 5 (step S111). Further, the communication mode selection unit 350 shifts to the processing of step S113.

In the processing of step S112, the communication mode selection unit 350 changes the selected content to the communication mode for the modulation method and the coding rate which are associated with the SNR value estimated by the SNR calculation unit 330 in the processing of step S107, in the field corresponding to the large fading degree in the communication mode selection table illustrated in FIG. 5 (step S112). Further, the communication mode selection unit 350 shifts to the processing of step S113.

In the processing of step S113, the communication mode selection unit 350 generates and transmits instruction information indicated by the communication mode selected in any one of steps S108, S111, and S112 (step S113).

Figure 8:
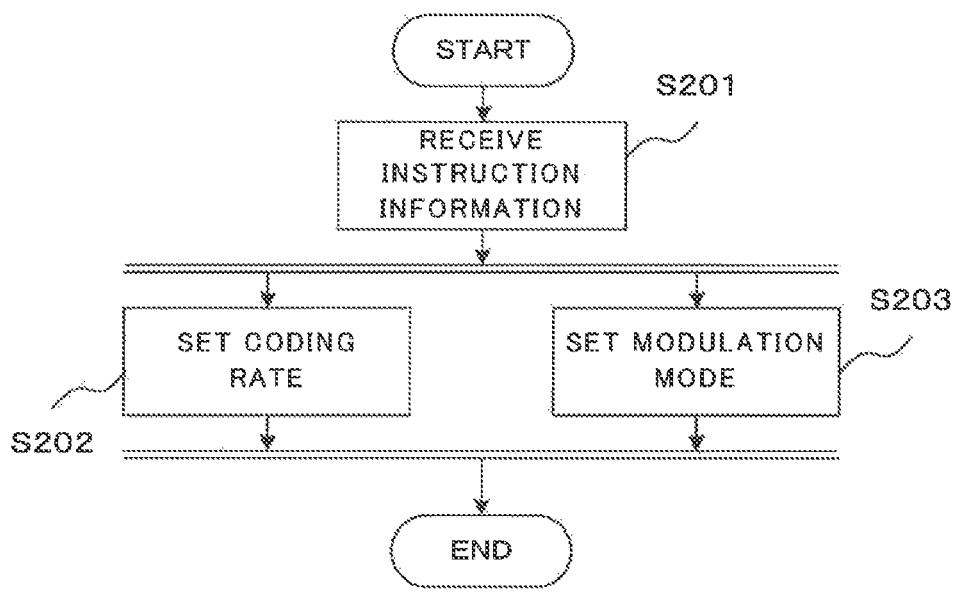
FIG. 8 is a flowchart illustrating an operation of a transmission-side communication device.

FIG. 8 is a flowchart illustrating an operation of the transmission-side communication device 200.

The transmission-side communication device 200 receives the instruction information transmitted in the processing of step S113 via the notification system 400 (step S201). Specifically, the instruction information transmitted in the processing of step S113 is input to each of the coding unit 210 and the modulation unit 220 of the transmission-side communication device 200 via the notification system 400.

Further, the coding unit 210 sets the coding rate which is a ratio of an error-correcting code to be added to the input data for transmission, based on the instruction information transmitted in the processing of step S113 (step S202). Hereinafter, the coding unit 210 adds the error-correcting code to the input data for transmission at the coding rate set in the processing of step S202. Further, the coding unit 210 inputs, to the modulation unit 220, the coded data obtained by adding the error-correcting code to the data for transmission.

Further, the modulation unit 220 sets the modulation method which is a method for modulation to be performed on the carrier by the input coded data based on the instruction information transmitted in the processing of step S113 (step S203). Hereinafter, the modulation unit 220 performs modulation processing on the carrier by the input coded data based on the modulation method set in the processing of step S203. Further, the modulation unit 220 inputs the modulation signal obtained by performing modulation processing on the carrier by the coded data to the antenna 230. The modulation signal, which is an electrical signal, is converted into a radio wave by the antenna 230 and is transmitted.

According to the present example embodiment, the fading detection unit 340 determines the fading degree between the transmission-side communication device 200 and the reception-side communication device 300 in accordance with the tap coefficients based on the error signal. Accordingly, the fading degree can be more appropriately determined compared to the method based on a variation in the communication environment.

Further, the communication mode selection unit 350 selects the communication mode for the signal transmitted from the transmission-side communication device 200 based on the fading degree determined by the fading detection unit 340 and the SNR value estimated by the SNR calculation unit 330. Accordingly, the communication mode for the signal transmitted from the transmission-side communication device 200 can be selected more appropriately.

Note that, although the present example is described assuming that the processing of steps S101 to S113 illustrated in FIG. 7 is executed in the reception-side communication device 300, it may also be configured such that a part or the whole of the processing of steps S106 to S112 is executed by the transmission-side communication device 200. Specifically, when the entire processing of steps S106 to S112 is executed by the transmission-side communication device 200, for example, the reception-side communication device 300 transmits error signal information indicating the error signal vector generated in the processing of step S104 and tap coefficient information indicating the tap coefficient generated in the processing of step S105 to the transmission-side communication device 200. Further, the transmission-side communication device 200 performs the processing of step S106 based on the tap coefficient information, and performs the processing of steps S107 and S108 based on the error signal information. Further, the transmission-side communication device 200 performs the processing of steps S109 to 112 depending on the processing result of steps S106 to S108. According to such configuration, the processing load of the reception-side communication device 300 and the transmission-side communication device 200 can be distributed depending on the processing load, processing capacity, or the like of the reception-side communication device 300 and the transmission-side communication device 200.

Second Example Embodiment

Figure 9:
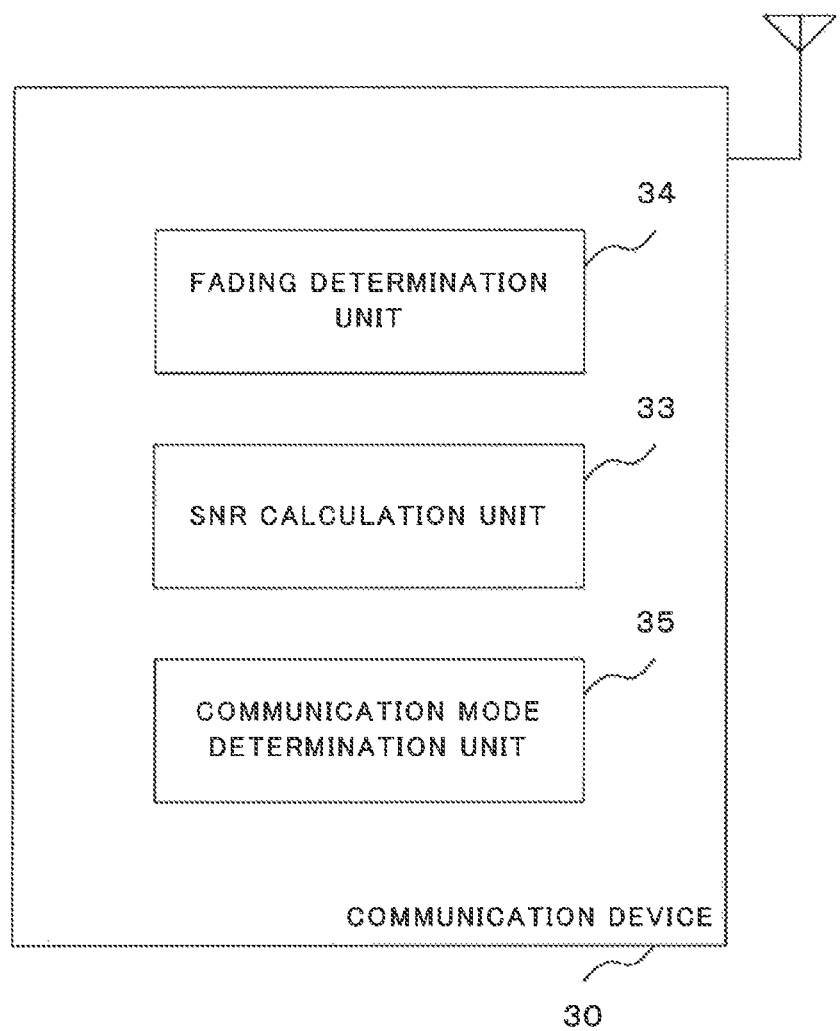
FIG. 9 is a block diagram illustrating a configuration example of a communication device according to a second example embodiment.

Next, a communication device 30 according to a second example embodiment will be described with reference to the drawings. FIG. 9 is a block diagram illustrating a configuration example of the communication device 30 according to the second example embodiment. As illustrated in FIG. 9, the communication device 30 according to the second example embodiment includes a fading determination unit 34, an SNR calculation unit 33, and a communication mode determination unit 35.

The fading determination unit 34 corresponds to, for example, the fading detection unit 340 according to the first example embodiment illustrated in FIG. 1. The SNR calculation unit 33 corresponds to, for example, the SNR calculation unit 330 according to the first example embodiment illustrated in FIG. 1. The communication mode determination unit 35 corresponds to, for example, the communication mode selection unit 350 according to the first example embodiment illustrated in FIG. 1.

The fading determination unit 34 determines the fading degree of the received radio wave.

The SNR calculation unit 33 calculates the SNR value of a signal based on the radio wave.

The communication mode determination unit 35 determines a communication mode in the communication from the transmission side of the radio wave based on the result of the determination by the fading determination unit 34 and the SNR value calculated by the SNR calculation unit 33.

According to the present example embodiment, the communication mode is determined based on the determination result of the fading degree by the fading determination unit 34 and the SNR value calculated by the SNR calculation unit 33.

Accordingly, an appropriate communication mode can be selected depending on the determination result of the fading degree.

Third Example Embodiment

Figure 10:
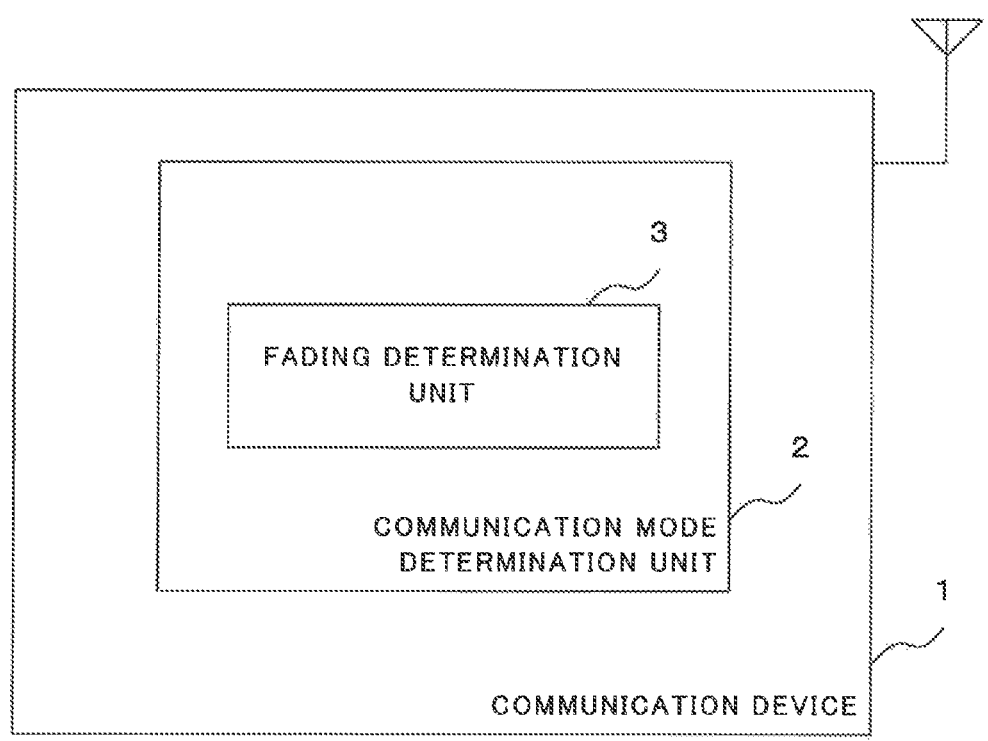
FIG. 10 is a block diagram illustrating a configuration example of a communication device according to a third example embodiment.

Next, a communication device 1 according to a third example embodiment will be described with reference to the drawings. FIG. 10 is a block diagram illustrating a configuration example of the communication device 1 according to the third example embodiment. As illustrated in FIG. 10, the communication device 1 according to the third example embodiment includes a communication mode determination unit 2. Further, the communication mode determination unit 2 includes a fading determination unit 3.

The communication mode determination unit 2 determines a communication mode based on the quality of a received radio wave.

Further, the fading determination unit 3 determines the fading degree of the received radio wave. Note that the fading determination unit 3 may determine the fading degree of the received radio wave by various methods including, for example, the above-described method, and the determination method is not particularly limited.

According to the present example embodiment, the fading degree can be determined and an appropriate communication mode can be selected depending on the determination result.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

Supplementary Note 1

A communication device comprising:

fading determination means for determining a fading degree of a received radio wave;

SNR calculation means for calculating a value of an SNR of a signal based on the radio wave; and communication mode determination means for determining a communication mode for the radio wave in communication from a transmission side, based on a determination result by the fading determination means and the value of the SNR calculated by the SNR calculation means.

Supplementary Note 2

The communication device according to Supplementary Note 1, further comprising distortion removal means for removing a distortion generated in the radio wave in a propagation path, wherein the distortion removal means comprises FIR filtering means, and tap coefficient determination means for determining a tap coefficient used in the FIR filtering means, and the fading determination means determines a fading degree, based on the tap coefficient determined by the tap coefficient determination means.

Supplementary Note 3

The communication device according to Supplementary Note 2, wherein the tap coefficient determination means sets the determined tap coefficient to the FIR filtering means.

Supplementary Note 4

The communication device according to Supplementary Note 2 or 3, further comprising error signal generation means for generating, based on a signal on which processing of removing the distortion by the distortion removal means is performed, an error component signal being an error component in the signal, wherein the tap coefficient determination means determines the tap coefficient, based on the error component signal generated by the error signal generation means and a signal based on the radio wave.

Supplementary Note 5

The communication device according to any one of Supplementary Notes 2 to 4, wherein the fading determination means determines a fading degree, based on a tap coefficient set to a center tap and a tap coefficient set to another tap among tap coefficients in the FIR filtering means.

Supplementary Note 6

The communication device according to Supplementary Note 5, wherein the fading determination means determines a fading degree, based on a value of a ratio of a tap coefficient set to another tap to a tap coefficient set to a center tap in the FIR filtering means.

Supplementary Note 7

The communication device according to any one of Supplementary Notes 2 to 6, further comprising error signal generation means for generating, based on a signal on which processing of removing the distortion by the distortion removal means is performed, an error component signal being an error component in the signal, wherein the SNR calculation means calculates an SNR of the signal, based on the error component signal generated by the error signal generation means.

Supplementary Note 8

The communication device according to any one of Supplementary Notes 1 to 7, wherein the communication mode determination means determines at least a modulation method for the communication.

Supplementary Note 9

The communication device according to any one of Supplementary Notes 1 to 8, wherein the communication mode determination means determines at least a coding rate of the communication.

Supplementary Note 10

A communication system comprising:

the communication device according to any one of Supplementary Notes 1 to 9; and a transmission device that performs processing on an input signal and transmits the signal in accordance with a communication mode determined by the communication mode determination means in the communication device.

Supplementary Note 11

The communication system according to Supplementary Note 10, wherein the transmission device performs at least modulation processing on the input signal in accordance with the communication mode.

Supplementary Note 12

The communication system according to Supplementary Note 10 or 11, wherein
the transmission device performs at least processing of adding an error-correcting code on the input signal in accordance with the communication mode.

Supplementary Note 13

A communication method comprising:
a fading determination step of determining a fading degree of a received radio wave;
an SNR calculation step of calculating a value of an SNR of a signal based on the radio wave; and
a communication mode determination step of determining a communication mode in communication for the radio wave from a transmission side, based on a determination result in the fading determination step and the value of the SNR calculated in the SNR calculation step.

Supplementary Note 14

The communication method according to Supplementary Note 13, further comprising a distortion removal step of removing a distortion generated in the radio wave in a propagation path, wherein
the distortion removal step comprises an FIR filtering step, and a tap coefficient determination step of determining a tap coefficient used in the FIR filtering step, and,
in the fading determination step, a fading degree is determined, based on the tap coefficient determined in the tap coefficient determination step.

Supplementary Note 15

A communication device comprising communication mode determination means for determining a communication mode, based on a quality of a received radio wave, wherein
the communication mode determination means comprises fading determination means for determining a fading degree of the received radio wave.

This application is based upon and claims the benefit of priority from Japanese patent application No. 2016-204820, filed on Oct. 19, 2016, the disclosure of which is incorporated herein in its entirety by reference.

REFERENCE SIGNS LIST 1, 30 Communication device
33 SNR calculation unit
3, 34 Fading determination unit
2, 35 Communication mode determination unit
200 Transmission-side communication device
210 Coding unit
220 Modulation unit
230, 380, 411, 421 Antenna
300 Reception-side communication device
310 Equalizer
311 FIR filter
312 Tap coefficient generation unit
320 Error signal generation unit
330 SNR calculation unit
340 Fading detection unit
350 Communication mode selection unit
360 Demodulation unit
370 Decoding unit
400 Notification system
410 Transmitter
420 Receiver
500-1 to 500-$n$ Delay unit
600-0 to 600-$n$ Multiplication unit
700-1 to 700-$n$ Addition unit

The invention claimed is:

1. A communication device comprising:
a memory storing instructions; and
one or more processors configured to execute the instructions to:
remove a distortion generated in a radio wave received in a propagation path, by an FIR filter with a tap coefficient;
generate, based on a signal on which processing of removing the distortion is performed, an error component signal being an error component in the signal;
determine the tap coefficient, based on the error component signal generated and a signal based on the radio wave;
determine a fading degree of the radio wave, based on the determined tap coefficient;
calculate the value of an SNR of a signal based on the radio wave; and
determine a communication mode for the radio wave in communication from a transmission side, based on the fading degree determined and the value of the SNR calculated.

2. The communication device according to claim 1, wherein
the one or more processors are configured to execute the instructions to:
set the determined tap coefficient to the FIR filter.

3. The communication device according to claim 1, wherein
the one or more processors are configured to execute the instructions to:
determine a fading degree, based on a tap coefficient set to a center tap and a tap coefficient set to another tap among tap coefficients in the FIR filter.

4. The communication device according to claim 3, wherein
the one or more processors are configured to execute the instructions to:
determine a fading degree, based on a value of a ratio of a tap coefficient set to another tap to a tap coefficient set to a center tap in the FIR filter.

5. The communication device according to claim 1, wherein the one or more processors are configured to execute the instructions to:
calculate an SNR of the signal, based on the error component signal generated.

6. The communication device according to claim 1, wherein
the one or more processors are configured to execute the instructions to:
determine at least a modulation method for the communication.

7. The communication device according to claim 1, wherein
the one or more processors are configured to execute the instructions to:
determine at least a coding rate of the communication.

8. A communication system comprising:
the communication device according to claim 1; and
a transmitter comprising:
a memory storing instructions; and
one or more processors configured to execute the instructions to:
perform processing on an input signal and to transmit the signal in accordance with the communication mode determined by the communication device.

9. The communication system according to claim 8, wherein
the transmitter performs at least modulation processing on the input signal in accordance with the communication mode.

10. The communication system according to claim 8, wherein
the transmitter performs at least processing of adding an error-correcting code on the input signal in accordance with the communication mode.

11. A communication method comprising:
removing a distortion generated in a radio wave received in a propagation path, by an FIR filter with a tap coefficient;
generating, based on a signal on which processing of removing the distortion is performed, an error component signal being an error component in the signal;
determining the tap coefficient, based on the error component signal generated and a signal based on the radio wave;
determining a fading degree of the radio wave, based on the determined tap coefficient;
calculating a value of an SNR of the signal based on the radio wave; and
determining a communication mode in communication for the radio wave from a transmission side, based on the determined fading degree and the calculated value of the SNR.

* * * * *